United States Patent
Erving et al.

(10) Patent No.: US 7,054,438 B2
(45) Date of Patent: *May 30, 2006

(54) METHOD AND APPARATUS FOR ACTIVE REDUCTION OF SPEAKERPHONE SINGING

(75) Inventors: Richard Henry Erving, Piscataway, NJ (US); Robert Raymond Miller, II, Convent Station, NJ (US)

(73) Assignee: AT&T Corp., New York, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/802,504

(22) Filed: Mar. 16, 2004

(65) Prior Publication Data
US 2004/0174988 A1    Sep. 9, 2004

Related U.S. Application Data

(63) Continuation of application No. 09/750,376, filed on Dec. 28, 2000, now Pat. No. 6,771,769.

(51) Int. Cl.
*H04M 9/08* (2006.01)

(52) U.S. Cl. .............................. 379/406.08; 379/406.01

(58) Field of Classification Search ........... 379/388.01, 379/388.07, 390.01, 390.02, 406.01, 406.16; 370/286
See application file for complete search history.

(56) References Cited

U.S. PATENT DOCUMENTS

| | | | | |
|---|---|---|---|---|
| 5,428,604 A | * | 6/1995 | Fuda | 379/406.1 |
| 5,646,990 A | * | 7/1997 | Li | 379/406.08 |
| 5,970,137 A | * | 10/1999 | Le Damany et al. | 379/388.06 |
| 6,301,364 B1 | * | 10/2001 | Lowmiller et al. | 381/66 |
| 6,771,769 B1 | * | 8/2004 | Erving et al. | 379/388.05 |

* cited by examiner

*Primary Examiner*—Daniel Swerdlow

(57) ABSTRACT

In a speakerphone device identification of signals (i.e., voice input or speaker output) in a process for reducing acoustic feedback, in a communication device, is accomplished by adding a signature noise (i.e., an identification mark) to output signals radiated by the speaker to enable these signals to be separated from speech input to the microphone. Having identified the signal (i.e., speech output) likely to cause a "singing" phenomenon, appropriate insertion loss to reduce the feedback may be added to the appropriate speech path within the communication device, to reduce a probability of singing.

12 Claims, 1 Drawing Sheet

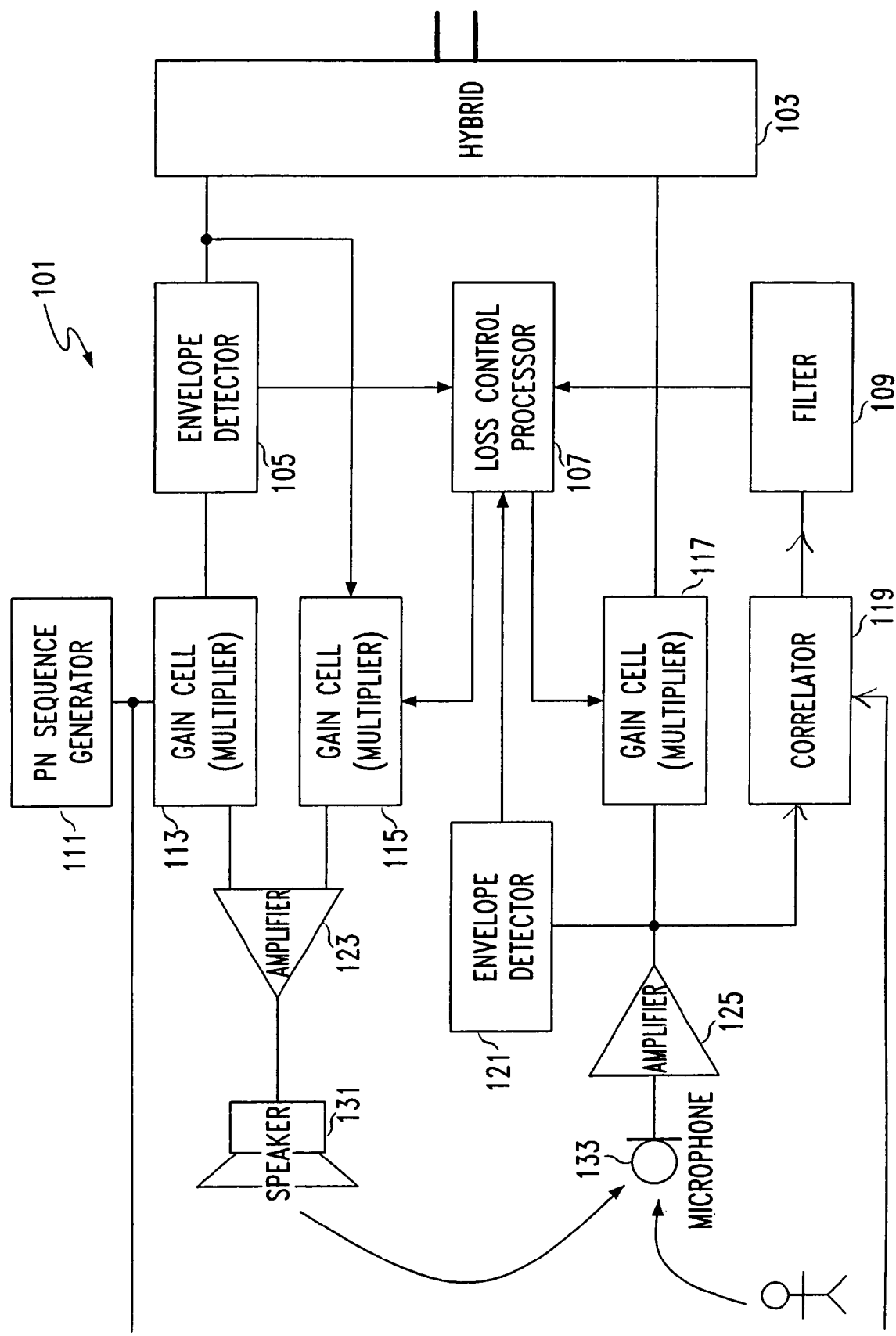

METHOD AND APPARATUS FOR ACTIVE REDUCTION OF SPEAKERPHONE SINGING

This application is a continuation of application Ser. No. 09/750,376, entitled "Method and Apparatus for Active Reduction of Speakerphone Singing," filed on Dec. 28, 2000, now U.S. Pat. No. 6,771,769, issued Aug. 3, 2004.

FIELD OF THE INVENTION

This invention relates to acoustic feedback in a communications device and specifically to speakerphone station sets and particularly to reduction of singing caused by feedback of a speaker output to the station set microphone. It also relates, in general, to any system in which audio output of a speaker may feed back into a microphone of the system causing singing (positive feedback) to occur. It specifically concerns a method and apparatus for determining the level of acoustic energy due to the output of a speaker appearing at a microphone of the communication device and to identifying such feedback energy as differentiated from that of the spoken input to the microphone.

BACKGROUND OF THE INVENTION

The amount of acoustic energy output of a speaker being fed back into a microphone of a duplex acoustic system with gain (i.e., a device used for communication purposes) determines the system acoustic stability. Such stability is important to prevent the generation of "singing" in which feedback of the speaker output onto the microphone causes reinforcement of sound from the loudspeaker and thus causes the speaker to emit a howl or similar high-pitched noise.

There are existing methods of preventing this singing effect that operate by inserting switched loss into either the speaker or microphone path to ensure system stability. The amount of switched loss to insert is determined by comparing the microphone signal level to the speaker signal level from the network via a hybrid connected to the speakerphone. Examination of the relative levels of the two signals permits a determination as to which signal level is presently active (i.e. speaker output or voice input). Loss is inserted in the path which is determined to be presently inactive ensuring that the total loop electroacoustic gain of the speakerphone and the network is less than one at the frequency where at zero degrees loop phase shift is experienced. This criterion, known as the Nyquist stability criterion, determines how much loss must be present in the electro-acoustic loop consisting of the speakerphone and the network to sustain oscillations, in order to ensure stability. The overall loss inserted, in many arrangements, to maintain stability is related to the sum of signal-dependent switched loss and some fixed loss amount, which is needed to provide "sing" margin to compensate for inaccuracies in determination of the total amount of loop gain necessary to prevent oscillations at specific frequencies.

The difficulty of these implementations has been in determining the amount of coupling which exists between the speakerphone's speaker and its microphone (i.e., speaker output vs. voice input). The acoustic environment between speaker and microphone is often unstable making a determination between speaker feedback and voice input to the microphone difficult to assess. In another arrangement, it has been thought possible to have the relative signal levels determined at the hybrid connection of the speakerphone to the telephone network. It is theoretically possible to sample incoming and outgoing speech at the hybrid connecting the phone to the network to infer loop gain, but this method has difficulties due to the isolation loss of the hybrid and is often unsatisfactory

SUMMARY OF THE INVENTION

In an exemplary embodiment of the invention, identification of signals (i.e., voice input or speaker output) in a process for reducing acoustic feedback, in a communication device, is accomplished by adding a signature noise (i.e., an identification mark) to output signals radiated by the speaker to enable these signals to be separated from speech input to the microphone. Having identified the signal (i.e., speech output) likely to cause a "singing" phenomenon, appropriate insertion loss to reduce the feedback may be added to the appropriate speech path within the communication device, to reduce a probability of singing.

In the exemplary embodiment of the invention, the signature noise, applied to the speech output, comprises a psuedo-noise signal consisting of a digitally generated sequence (i.e., a PN sequence). The envelope of the speech signal fed to the loudspeaker modulates this PN sequence.

The "signature" (i.e., PN sequence) added to speech issuing from the loud speaker identifies it in contrast to voice speech input to the microphone allowing it to be used to assist in any loss-switching process. In creating the signature, the speech output of the loudspeaker is combined with a pseudo-noise signal waveform consisting of a digitally generated sequence. The envelope of the speech that is fed to the loudspeaker modulates the PN signal. As such, it represents a low-level, "background" pink noise signal whose amplitude is proportional to the envelope of the speech that issues from the loudspeaker.

The speech input to the microphone is correlated with a version of the PN sequence, such that the correlated result is in direct proportion to the amount of speech sampled by the microphone issuing from the loudspeaker. Voice input to the microphone does not contain the PN sequence and its level may be separately ascertained. As part of the PN detection process the voice input speech is largely ignored so as to be independent from the PN correlation output. For wideband acoustic systems, the technique may be applied with pink noise "bands", which utilize separate PN sequences. In such an embodiment, separate correlators may be used to adjust loss in various portions of the audio pass band to effect stability control, minimizing degradation of the entire program content due to feedback in only one portion of the pass band.

A second PN sequence may also be used to characterize the acoustic coupling path between the speaker and microphone. This second PN sequence would be made orthogonal to the first PN sequence in order to avoid interference between the two, and would be sent at a constant level through the loudspeaker. This second PN sequence would then be received by the microphone and correlated against the transmitted sequence to determine the impulse response of the acoustic path. This impulse response is then used to control an acoustic echo canceller. The advantage of using a PN sequence in addition to human speech in an acoustic echo canceller is that the PN sequence is a broadband signal and, hence, more accurately probes the acoustic environment.

BRIEF DESCRIPTION OF THE DRAWINGS

The sole FIGURE is a block schematic of a speakerphone suitable for practicing the principles of the invention.

DETAILED DESCRIPTION

A speakerphone 101, as illustrated in the drawing, includes processing modules enabling practice of a method of identifying speaker output signals in accord with the principles of the invention. The illustrative speakerphone is attached to the network through a hybrid 103. Hybrid circuits are well known in telephony and further discussion is not believed necessary. Input into and output from the speakerphone is by the loudspeaker 131 and microphone 133, respectively. Incoming signals from the telephone network are transmitted from the hybrid 103 to an envelope detector 105 to convert the incoming signals to a slowly varying voltage level that follows the energy of the incoming signal. The output of the envelope detector 105 is applied to a gain cell 113 (multiplier) and coupled to the loudspeaker 131 via an audio amplifier 123. Output signals are also routed to directly couple the hybrid 103 to another gain cell (multiplier) 115 that is also coupled to the amplifier 123 and loudspeaker 131. Those skilled in the art will observe that the analog processing functions described illustratively above could be performed by digital signal processing means.

An exemplary embodiment contemplates a speakerphone wherein a loss-control processor is used to effect switched loss in either the transmit or receive path via the gain cells. This loss control processor is responsive to sensed envelopes of incoming (from the network) speech, as well as outgoing (to the network) speech, and the filtered correlator output.

In accord with the invention, a PN sequence generator 111 is connected to apply the PN sequence to the gain cell 113 where it is modulated by the envelope of the incoming speech. In one exemplary embodiment, a minimum (non-zero) amount of PN noise is applied even when incoming speech is not present. This level ensures that the system will be able to prevent buildup of feedback in situations where neither incoming nor outgoing speech is present. Since the PN noise is low-level, it will not seriously degrade the quality of the incoming speech as it issues from the loudspeaker nor will it pose objectionable "standby" noise.

Incoming voice-generated speech (i.e., human-generated input speech) is coupled from microphone 133 to amplifier 125 and coupled to gain cell (multiplier) 117. An envelope detector 121 is coupled to detect the envelope of the amplified speech output of the microphone 133. A gain cell (multiplier) 117 connects amplifier 125 to the hybrid circuit 103, effecting a means of inserting loss into the transmit path to the network.

The output of amplifier 125 is also connected to a correlator circuit 119. Correlator circuit 119 is also connected to receive the PN sequence from PN sequence generator 111. The correlator 119 output identifies speaker output fed back to the microphone. The correlator output is filtered in filter 109 to band limit it to generate a signal reflective of the amount of feedback signal from the loudspeaker. This reflective signal is applied to a loss control processor 107. Both envelope detectors 121 and 105 have outputs applied to loss control processor 107 whose function is to determine the amount of switched loss to be applied to reduce the speakerphone-network loop gain to less than one according to the Nyquist stability criterion.

The loss control processor 107 is responsive to envelope detector 105 and 121 representing input and output signals and to the filtered correlator output. Its (i.e., Correlator 119) function is to correlate the microphone signal output with a version of the PN sequence so that the output of the microphone, due to speech input, is differentiated from speech output. Hence, loss control is activated in direct proportion to the amount of speech sampled by the microphone that has issued from the loudspeaker. Voice input speech applied to the microphone will not contain the PN sequence. Accordingly, the speech input signal level may be accurately determined. In operation such as is contemplated in the exemplary embodiment, the human speech will be ignored by the correlator, because it contains no significant PN sequence content. The information representing the differential speech characteristics is coupled to the loss control processor 107 that determines the loss to be applied to the speech circuits. The loss control processor 107 may be a stored program control processor programmed in software to perform the specified function. No detailed structural description is believed necessary, since stored program processors have a standard structure.

Since the PN sequence spreads the frequency content of the noise over the audio pass band of the speaker, uneven frequency response of the loudspeaker or microphone, which partly determines the extent of loudspeaker-microphone coupling will pose less of an influence on the accuracy of the feedback determination than with conventional systems. It should be noted that movement of a speakerphone within an enclosed sound-field environment could cause violent changes in speaker/microphone coupling. The ability of the PN-pilot technique to detect these changes in real time can reduce the need to apply large "singing" safety margins that tend to make speakerphone conversations less "transparent".

A feature of the described method is its ability to extend the process to characterize the acoustic channel for purposes of echo cancellation or equalizing the loudspeaker response to improve audio quality. In one arrangement a second PN sequence may be added for adjusting echo-canceling circuitry.

It is readily apparent that the foregoing technique may reduce the disruptive effects of a condition of "double talk", where high speech levels are produced at the microphone from both incoming speech and feedback speech input. Such cases occur when the user of the speakerphone attempts to interrupt continuous speech arriving from the distant talker. In this instant, PN sequence levels are detected and appropriate supplemental loss may be is inserted into the loudspeaker path to ensure that the speakerphone user will be heard by the distant party as an "interrupt".

While the exemplary embodiment has been presented in terms of a speakerphone, it is to be understood that any communications device combining speech input and speech output, may advantageously utilize the described invention. For example, a small handheld device could very easily experience acoustic feedback between an output speaker (i.e., not a loud speaker here) and an input microphone due to close proximity of the two and because a handheld speakerphone is subject to movement in a near-field environment which may contain reflective objects capable of materially changing speaker-microphone coupling at various frequencies. Other embodiments, permitting practice of the invention, will be readily apparent to those skilled in the art, for example suppression of public address system feedback.

The invention claimed is:

1. In a communication device having a speech input device and a voice output device in proximity to one another wherein an output from the voice output device may be feedback to the speech input device, a method of applying loss insertion into the communication device to prevent feedback oscillations/acoustic instability between the speech input device and the voice output device, comprising the steps of:
   modulating a pseudo-random noise signal with a signal envelope of a signal to the voice output device; and
   applying the modulated pseudo-random noise signal as an identification mark to the output from the voice output device.

2. The method of claim 1, further comprising the step of:
   introducing insertion loss in the inactive path of the speech input device and the voice output device based on their relative signal levels in order to reduce the feedback oscillations.

3. The method of claim 2 wherein the step of introducing insertion loss includes:
   introducing the insertion loss based on a comparison of the signal envelope of the signal to the voice output device and a signal envelope of a signal from the speech input device.

4. The method of claim 3 wherein the step of introducing insertion loss further includes:
   introducing the insertion loss based on a correlation between the speech input and voice output as modified by the identification marker to differentiate between the input and output.

5. The method of claim 2, wherein the step of:
   introducing insertion loss is effective to prevent buildup of feedback where neither incoming nor outgoing speech is present.

6. The method of claim 2, wherein the step of:
   introducing an insertion loss is accomplished by modifying at least one of a gain of received loudspeaker speech and a gain of human input speech.

7. The method of claim 1, including a further step of:
   using several frequency sub-bands, each with PN sequence to adjust switched loss in each of the bands.

8. A speakerphone connected to a communication network, comprising:
   a loudspeaker for providing voice output connected to an output path from the communication network, the output path having envelope detection;
   a microphone for accepting voice input connected to an input path to the communication network;
   a pseudo-noise sequence generator;
   a gain cell connected to the pseudo-noise generator for modulating a pseudo-noise output from the pseudo-noise generator with an output from the loudspeaker output path envelope detection; and
   an amplifier for combining an output from the gain cell with the signal from the loudspeaker output path.

9. The speakerphone of claim 8, further comprising:
   a correlator connected to the pseudo-noise generator output and to the microphone input path to detect pseudo-noise correlation between signals in the input and output paths.

10. The speakerphone of claim 9, further comprising:
    envelope detection in the microphone input path; and
    a loss control processor responsive to the envelope detection in the input path, to envelope detection in the output path and to an output from the correlator, to insert loss in one of the paths to prevent signal feedback between the input and output path.

11. The speakerphone of claim 10 further comprising:
    a filter coupling the correlator to the loss control processor.

12. The speakerphone of claim 10, further comprising:
    a gain cell in the output path and a gain cell in the input path, the gain cells being connected to the loss control processor for inserting the loss.

* * * * *